(12) United States Patent
Ueyama

(10) Patent No.: US 10,171,722 B2
(45) Date of Patent: Jan. 1, 2019

(54) LENS UNIT AND REAR-SIDE FOCUS ADJUSTMENT SYSTEM OF INFRARED CAMERA

(71) Applicant: Tamron Co., Ltd., Saitama-shi (JP)

(72) Inventor: Yuichi Ueyama, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 114 days.

(21) Appl. No.: 15/124,531

(22) PCT Filed: Mar. 10, 2015

(86) PCT No.: PCT/JP2015/056968
§ 371 (c)(1),
(2) Date: Feb. 8, 2017

(87) PCT Pub. No.: WO2015/137320
PCT Pub. Date: Sep. 17, 2015

(65) Prior Publication Data
US 2017/0150034 A1 May 25, 2017

(30) Foreign Application Priority Data

Mar. 10, 2014 (JP) ................................ 2014-046776

(51) Int. Cl.
*H04N 5/33* (2006.01)
*H04N 5/232* (2006.01)
(Continued)

(52) U.S. Cl.
CPC ......... *H04N 5/23212* (2013.01); *G02B 7/028* (2013.01); *G02B 7/09* (2013.01);
(Continued)

(58) Field of Classification Search
CPC .... H04N 5/23212; H04N 5/338; G02B 7/028; G02B 7/09; G02B 13/14
(Continued)

(56) References Cited

U.S. PATENT DOCUMENTS 6,118,947 A 9/2000 Suh
6,989,865 B1 1/2006 Ohta
(Continued)

FOREIGN PATENT DOCUMENTS

JP 6410785 A 1/1989
JP 11133289 A 5/1999
(Continued)

*Primary Examiner* — Helen Shibru
(74) *Attorney, Agent, or Firm* — The Webb Law Firm

(57) ABSTRACT

A lens unit and a rear-side focus adjustment system for infrared cameras capable of performing rear-side focus adjustments even when the position of the detection surface of an infrared sensor is unknown in an infrared camera. The lens unit is detachably mounted on a camera body that detects infrared light with an infrared sensor and converts the infrared light to an image signal, the lens unit including a focus adjustment lens and controller. The controller calculates a rear-side focus adjustment amount for causing a rear-side focus position to correspond to the detection surface based on an error between an actually measured focused position of the focus adjustment lens relative to an object at a particular object distance and a theoretically focused position of the focus adjustment lens calculated based on the object distance and controls the position of the focus adjustment lens based on the rear-side focus adjustment amount.

8 Claims, 1 Drawing Sheet

(51) Int. Cl.
 *G02B 7/36* (2006.01)
 *G03B 3/10* (2006.01)
 *G02B 7/02* (2006.01)
 *G02B 7/09* (2006.01)
 *G02B 13/14* (2006.01)

(52) U.S. Cl.
 CPC ............... *G02B 7/36* (2013.01); *G02B 13/14* (2013.01); *G03B 3/10* (2013.01); *H04N 5/33* (2013.01)

(58) Field of Classification Search
 USPC ........................................................ 348/164
 See application file for complete search history.

(56) References Cited

U.S. PATENT DOCUMENTS

| | | | |
|---|---|---|---|
| 9,207,428 B2 * | 12/2015 | Abe | G02B 7/282 |
| 2011/0199532 A1 * | 8/2011 | Jin | G03B 13/36 |
| | | | 348/345 |
| 2012/0212621 A1 | 8/2012 | Nakai et al. | |
| 2014/0192092 A1 * | 7/2014 | Aruga | G02B 27/017 |
| | | | 345/690 |
| 2015/0085179 A1 * | 3/2015 | Van Heugten | H04N 5/23212 |
| | | | 348/349 |

FOREIGN PATENT DOCUMENTS

| | | |
|---|---|---|
| JP | 11183775 A | 7/1999 |
| JP | 2012173546 A | 9/2012 |
| JP | 2012181362 A | 9/2012 |

\* cited by examiner

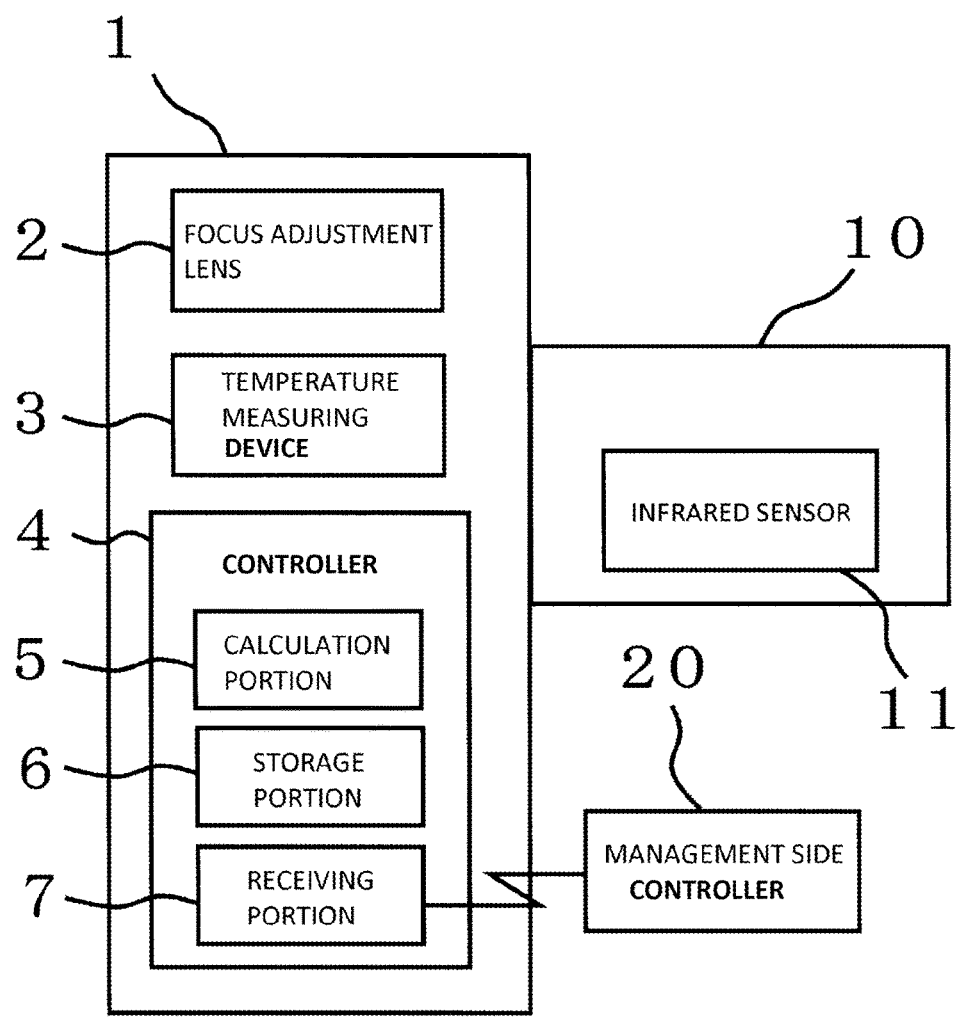

ment system and the method to adjust the rear-side focus, as disclosed in Patent Document 1, use the position of the designed detection surface of the infrared sensor as the reference point to adjust rea-side focus, high accuracy is required when mounting lens unit to the camera body in order to obtain a clear image.

LENS UNIT AND REAR-SIDE FOCUS ADJUSTMENT SYSTEM OF INFRARED CAMERA

CROSS-REFERENCE TO RELATED APPLICATIONS

This application is the United States national phase of International Application No. PCT/JP2015/056968 filed Mar. 10, 2015, and claims priority to Japanese Patent Application No. 2014 -046776 filed Mar. 10, 2014, the disclosures of which are hereby incorporated in their entirety by reference.

TECHNICAL FIELD

The present invention relates to a lens unit and a rear-side focus adjustment system of an infrared camera, and in particular to a lens unit and a rear-side focus adjustment system of an infrared camera, which are capable of performing a rear-side focus adjustment even when the position of the detection surface of an infrared sensor is unknown in an infrared camera.

BACKGROUND OF THE INVENTION

Recently, an infrared camera that detects infrared rays radiated from an object to perform object recognition has been widely used for the purpose of security in darkness. In this connection, when using the infrared camera for the purpose of security, it is necessary to obtain a clear image, and for that purpose, it is necessary to accurately form infrared light transmitted through a lens group in a lens unit into an image on a detection surface of an infrared sensor. To achieve cost reduction, however, so-called "bolometer type" is often used. Bolometer-type infrared sensor is not easily influenced by thermal convection and the like that causes degradation of detection accuracy and is vacuum-locked in a container composed of metal or the like. Therefore, a position of the detection surface can easily deviate during the manufacturing process, and it is not possible to check an internal state of the container from the outside. Even a slight deviation of the detection surface of the infrared sensor results in error where the position of the rear-side focus of the lens unit does not match the detection surface. That makes it becomes difficult to automatically control the position of the focus adjustment lens, and it becomes impossible to obtain a clear image.

To cope with the above problem, for example, Patent Literature 1 discloses a rear-side focus adjustment system of infrared camera and the method to adjust the rear-side focus, in which focusing is possible even if there are individual differences in the position of the detection surface of the infrared sensor due to vacuum processing. More specifically, the rear-side focus adjustment system for infrared cameras disclosed in Patent Literature 1 adjusts a reference position of a lens group in an optical axis direction, with the position of the detection surface position of the infrared sensor as a rear-side focus, based on detection surface position information from the outside received by means of a lens unit (see claim 1 and the like in Patent Literature 1).

CITATION LIST

Patent Literature

[Patent Literature 1]
Japanese Patent Laid-Open No. 2012-173546

SUMMARY OF INVENTION

In the rear-side focus adjustment system for infrared camera, which is disclosed in Patent Literature 1, however, the detection surface position information on the infrared sensor used at the time of performing an adjustment of the rear-side focus is regarding to a position of a designed detection surface (a position of a flange back), and the position has to be already known. Recently, lens units of infrared cameras are exchanged depending on purpose, such as telephotography and wide-angel photography, just as visible light cameras. Because the rear-side focus adjust- In view of the above situation, the objective of the present invention is to provide a lens unit and a rear-side focus adjustment system of infrared camera that are capable of performing rear-side focus adjustment even when a position of a detection surface of an infrared sensor is unknown in an infrared camera.

As a result of diligent study, the present inventor et al. has solved the problem by adopting a lens unit and a rear-side focus adjustment system for infrared cameras, as described below.

A lens unit according to the present invention is a lens unit detachably mounted on a camera body that detects infrared light with an infrared sensor and performs a process for converting the infrared light to an image signal; the lens unit including a focus adjustment lens and controller for controlling a position of the focus adjustment lens; wherein the controller calculating a rear-side focus adjustment amount for causing the rear-side focus position to correspond to the detection surface based on an error between an actually measured focused position of the focus adjustment lens relative to an object at a particular object distance and a theoretically focused position of the focus adjustment lens calculated based on the object distance; and thereby controlling the position of the focus adjustment lens based on the rear-side focus adjustment amount.

A rear-side focus adjustment system of infrared camera according to the present invention includes the lens unit and the camera body that detects infrared light with the infrared sensor and performs the process for converting the infrared light to an image signal, as described above.

A lens unit and a rear-side focus adjustment system for infrared cameras, according to the present invention are capable of performing rear-side focus adjustments even when the position of the detection surface of an infrared sensor is unknown. Therefore, according to the lens unit and the rear-side focus adjustment system of infrared camera according to the present invention, it is possible to continuously keep imaging the performance of the infrared camera at a high performance level, even when the mounting of the lens unit on the camera body is not performed with a high accuracy.

BRIEF DESCRIPTION OF DRAWING

FIG. 1 is a block diagram showing a construction of a rear-side focus adjustment system for infrared cameras, according to the present invention.

DESCRIPTION OF EMBODIMENT

A preferable embodiment of a lens unit and a rear-side focus adjustment system of an infrared camera according to the present invention is described below with reference to FIG. 1.

FIG. 1 is a block diagram showing the construction of the rear-side focus adjustment system for infrared cameras. The rear-side focus adjustment system of infrared camera according to the present invention is a rear-side focus adjustment system of infrared camera equipped with a Camera body 10 that detects infrared light with Infrared sensor 11 and performs a process for converting the infrared light to an image signal; Lens unit 1 that is detachably mounted on Camera body 10. Note that Camera body 10 is equipped with Infrared sensor 11 having a detection surface for detecting infrared light. Further, Lens unit 1 is equipped with Focus adjustment lens 2, and controller 4 for controlling the position of Focus adjustment lens 2. Controller 4 calculates a rear-side focus adjustment amount for causing a rear-side focus position to correspond to the detection surface based on an error between an actually measured focused position of Focus adjustment lens 2 relative to an object at a particular object distance and a theoretically focused position of Focus adjustment lens 2, calculated based on the object distance, and controls the position of Focus adjustment lens 2 based on the rear-side focus adjustment amount.

The infrared camera of the present invention is composed of at least Lens unit 1 having Focus adjustment lens 2 and Camera body 10. Lens unit 1 of the present invention is equipped with Focus adjustment lens 2 inside Lens unit 1 so as to be movable in an optical axis direction. Lens unit 1 of the present invention is equipped with a lens mount at an end portion on its image plane side and is mounted on Camera body 10 by the lens mount being engaged with a camera mount provided on Camera body 10. Further, Camera body 10 of the present invention detects an amount of infrared rays formed into an image on the detection surface of Infrared sensor 11 as a temperature change amount and communicates the temperature change amount to an image processor (not shown) as a detection signal to perform image processing.

Further, Lens unit 1 of the present invention is equipped with controller 4 for controlling the position of Focus adjustment lens 2; and controller 4 is equipped with Calculation portion 5 that calculates the rear-side focus adjustment amount for causing the rear-side focus position to correspond to the detection surface of Infrared sensor 11. At this time, Calculation portion 5 calculates the theoretically focused position of Focus adjustment lens 2 based on information about the object distance given from controller 4. Then, Calculation portion 5 calculates the rear-side focus adjustment amount for causing the rear-side focus position to correspond to the detection surface as a difference between the actually measured focused position of Focus adjustment lens 2 relative to the object at the object distance given by controller 4 and the calculated theoretically focused position of Focus adjustment lens 2. In the rear-side focus adjustment system of infrared camera according to the present invention, it is possible to arbitrarily make settings for the object as far as the object distance is known and the object is focusable, and it is not necessary to use special equipment such as a collimator. Further, at the time of determining the actually measured focused position of Focus adjustment lens 2 for a certain object at a particular object distance, arbitrary means, such as judgment by bare eyes and automatic judgment, can be used.

By Lens unit 1 of the present invention being equipped with the construction described above, controller 4 can control the position of the focus adjustment lens with a high accuracy based on the rear-side focus adjustment amount even if the position of the detection surface of the infrared sensor is unknown. Therefore, according to the rear-side focus adjustment system for infrared cameras according to the present invention, it is possible to, at the time of mounting Lens unit 1 on Camera body 10, use an arbitrary method such as a bayonet type and a screw-in type because it is not necessary to mount Lens unit 1 on Camera body 10 with a high accuracy.

It is preferable that controller 4 in Lens unit 1 according to the present invention stores the rear-side focus adjustment amount described above and, at time of startup, controls the position of Focus adjustment lens 2 based on the rear-side focus adjustment amount.

Lens unit 1 of the present invention can be equipped with Storage portion 6 into which the rear-side focus adjustment amount detected by Infrared sensor 11 is stored by controller 4 (which Lens unit 1 is provided with). By providing Lens unit 1 with at least such a construction, according to the present invention, becomes possible for Lens unit 1 to continuously control the position of Focus adjustment lens 2 based on the rear-side focus adjustment amount at the time of startup. Therefore, even when being unintentionally restarted in the event of a power failure and the like, the infrared camera of the present invention can obtain a clear image again after a short time.

Further, it is preferable that the rear-side focus adjustment system of an infrared camera according to the present invention is equipped with Management side controller 20 that transmits information about an object distance to controller 4 from outside.

If the rear-side focus adjustment system of the infrared camera is equipped with Management side controller 20 that transmits the information about an object distance to controller 4 from outside, Lens unit 1 according to the present invention can receive the information about the object distance transmitted by Management side controller 20 with Receiving portion 7, with which controller 4 is provided with. Further, Lens unit 1 according to the present invention can also receive, for example, information about a rear-side focus adjustment instruction or an instruction to adjust Focus adjustment lens 2 to a focused position in addition to the information about the object distance by Management side controller 20, with Receiving portion 7 of controller 4 and can automatically adjust Focus adjustment lens 2 to the focused position. By the way, in the present invention, the form of transmission from Management side controller 20 to controller 4 at time of Management side controller 20 transmitting the information about the object distance and the like may be wired or wireless.

Further, it is preferable that Lens unit 1 according to the present invention is equipped with temperature measuring device 3, which measures an internal temperature of Lens unit 1, and that controller 4 calculates a position deviation amount of Focus adjustment lens 2 based on the temperature measured by Temperature measuring device 3 and controls the position of Focus adjustment lens 2 based on the position deviation amount.

In Lens unit 1, according to the present invention, controller 4 can calculate the position deviation amount of Focus adjustment lens 2 based on the internal temperature of Lens unit 1 measured by Temperature measuring device 3 and reflect this calculated position deviation amount on the rear-side focus adjustment amount already determined to adjust the position of Focus adjustment lens 2. Thus, controller 4 of the present invention can greatly reduce the influence of focus position deviation caused by a lens barrel or the like expanding and contracting and the accompanying change in the internal temperature of Lens unit 1, by controlling the position of Focus adjustment lens 2 by adding this position deviation amount. Lens unit 1, according to the present invention, can be equipped with a temperature sensor inside Lens unit 1 as Temperature measuring device 3, and the number and arrangement of temperature sensors which Lens unit 1 is to be equipped is not limited.

According to Lens unit 1 and the rear-side focus adjustment system of infrared camera in the present invention, Lens unit 1 with the construction described above makes it possible to accurately calculate the position deviation amount of Focus adjustment lens 2 in a short time without being influenced by the temperature of the environment where the camera is set up, and, therefore, it is possible to stably obtain a clear image.

As described above, a lens unit according to one aspect of the present invention is a lens unit detachably mounted on a camera body that detects infrared light with an infrared sensor and performs a process for converting the infrared light to an image signal, the lens unit including a focus adjustment lens and controller for controlling a position of the focus adjustment lens; wherein the controller calculates a rear-side focus adjustment amount for causing a rear-side focus position to correspond to the detection surface based on an error between an actually measured focused position of the focus adjustment lens relative to an object at a particular object distance and a theoretically focused position of the focus adjustment lens calculated based on the object distance; and which controls the position of the focus adjustment lens based on the rear-side focus adjustment amount.

To summarize the above, it is seen that it is preferable that, in the lens unit according to the one aspect of the present invention, the controller stores the rear-side focus adjustment amount and, at the time of startup, controls the position of the focus adjustment lens based on the rear-side focus adjustment amount.

Further, it is seen that it is preferable that the lens unit, according to the one aspect of the present invention, includes temperature measuring device for measuring an internal temperature of the lens unit; and the controller calculates a position deviation amount of the focus adjustment lens based on the temperature measured by the temperature measuring device and controls the position of the focus adjustment lens based on the position deviation amount.

Furthermore, it can be said that it is preferable that, when the rear-side focus adjustment system of an infrared camera, according to one aspect of the present invention, includes the lens unit described above and a camera body that detects infrared light with an infrared sensor and performs a process for converting the infrared light to an image signal, the rear-side focus adjustment system of infrared camera includes management side controller for transmitting information about an object distance to the controller from outside.

A lens unit and a rear-side focus adjustment for infrared cameras, according to the present invention, are capable of performing rear-side focus adjustments, even when the position of the detection surface of an infrared sensor is unknown. Further, according to the lens unit and the rear-side focus adjustment system of infrared camera according to the present invention, it becomes possible to perform rear-side focus adjustments more speedily than before, by the lens unit itself having a function of calculating a rear-side focus adjustment amount and a function of storing information required for the rear-side focus adjustment. Therefore, according to the lens unit and the rear-side focus adjustment system of infrared camera according to the present invention, it is possible to provide an infrared camera apparatus capable of accurately performing position control of the focus adjustment lens and stably obtaining a clear image, and, therefore, the infrared camera apparatus can be preferably used for purpose of security.

REFERENCE SIGNS LIST

1 lens unit
2 focus adjustment lens
3 temperature measuring device
4 controller
5 calculation portion
6 storage portion
7 receiving portion
10 camera body
11 infrared sensor
20 management side controller

The invention claimed is:

1. A lens unit detachably mounted on a camera body that detects infrared light with an infrared sensor and performs a process for converting the infrared light to an image signal, the lens unit comprising a focus adjustment lens and controller for controlling a position of the focus adjustment lens; wherein
    the controller calculates a rear-side focus adjustment amount for causing a rear-side focus position to correspond to a detection surface of the infrared sensor based on an error between an actually measured focused position of the focus adjustment lens relative to an object at a particular object distance and a theoretically focused position of the focus adjustment lens calculated based on the object distance and controls the position of the focus adjustment lens based on the rear-side focus adjustment amount.

2. The lens unit according to claim 1, wherein the controller stores the rear-side focus adjustment amount and controls the position of the focus adjustment lens based on the rear-side focus adjustment amount at the time of startup.

3. The lens unit according to claim 1, further comprising temperature measuring device for measuring an internal temperature of the lens unit; wherein
    the controller calculates a position deviation amount of the focus adjustment lens based on the temperature measured by the temperature measuring device and controls the position of the focus adjustment lens based on the position deviation amount.

4. A rear-side focus adjustment system of an infrared camera, comprising the lens unit according to claim 1 and the camera body that detects infrared light with the detection surface of the infrared sensor and performs the process for converting the infrared light to an image signal.

5. The rear-side focus adjustment system of infrared camera according to claim 4, comprising a management side controller for transmitting information about an object distance to the controller from outside.

6. The lens unit according to claim 2, further comprising temperature measuring device for measuring an internal temperature of the lens unit; wherein the controller calculates a position deviation amount of the focus adjustment lens based on the temperature measured by the temperature measuring device and controls the position of the focus adjustment lens based on the position deviation amount.

7. A rear-side focus adjustment system of an infrared camera, comprising the lens unit according to claim 2 and the camera body that detects infrared light with the detection surface of the infrared sensor and performs the process for converting the infrared light to an image signal.

8. A rear-side focus adjustment system of an infrared camera, comprising the lens unit according to claim 3 and the camera body that detects infrared light with the detection surface of the infrared sensor and performs the process for converting the infrared light to an image signal.

\* \* \* \* \*